US012567907B2

(12) United States Patent
Kanazawa et al.

(10) Patent No.: US 12,567,907 B2
(45) Date of Patent: Mar. 3, 2026

(54) OPTICAL TRANSMITTER

(71) Applicant: NTT, Inc., Tokyo (JP)

(72) Inventors: Shigeru Kanazawa, Musashino (JP);
Takahiko Shindo, Musashino (JP);
Meishin Chin, Musashino (JP);
Yasuhiko Nakanishi, Musashino (JP)

(73) Assignee: NTT, Inc., Tokyo (JP)

(*) Notice: Subject to any disclaimer, the term of this
patent is extended or adjusted under 35
U.S.C. 154(b) by 248 days.

(21) Appl. No.: 18/255,819

(22) PCT Filed: Dec. 15, 2020

(86) PCT No.: PCT/JP2020/046820
§ 371 (c)(1),
(2) Date: Jun. 2, 2023

(87) PCT Pub. No.: WO2022/130512
PCT Pub. Date: Jun. 23, 2022

(65) Prior Publication Data
US 2024/0031034 A1    Jan. 25, 2024

(51) Int. Cl.
*H04B 10/564*    (2013.01)
*H04B 10/50*    (2013.01)
*H04J 14/02*    (2006.01)

(52) U.S. Cl.
CPC ......... *H04B 10/564* (2013.01); *H04B 10/506*
(2013.01); *H04J 14/0221* (2013.01)

(58) Field of Classification Search
CPC .... H04B 10/564; H04B 10/506; H04B 10/50;
H04B 10/40; H04B 10/572; H04J
14/0221; H04J 14/02; H04J 14/00
See application file for complete search history.

(56) References Cited

U.S. PATENT DOCUMENTS

2017/0026116 A1*    1/2017    Sprem ................. H04J 14/0307
2017/0153458 A1    6/2017    Mitamura

FOREIGN PATENT DOCUMENTS

JP        2017-098505 A    6/2017
JP        2019050242 A  *  3/2019

OTHER PUBLICATIONS

K. Tsuzuki et.al., *Full C-Band Tunable DFB Laser Array Copack-aged with InP Mach-Zehnder Modulator for DWDM Optical Com-munication Systems,* Journal of Selected Topics in Quantum Elec-tronics, vol. 15, No. 3, 2009, pp. 521-527.

(Continued)

*Primary Examiner* — Hibret A Woldekidan
(74) *Attorney, Agent, or Firm* — Workman Nydegger

(57)        ABSTRACT

The optical loss of the output light of the first light source
transmitted through the optical multiplexer is suppressed.
An optical transmitter includes: a first light source; one or
more second light sources having mutually different wave-
lengths and each having a wavelength different from that of
the first light source; an optical multiplexer that transmits
output light from the first light source from a first end
surface to a second end surface facing the first end surface,
causes the output light to reflect on a reflecting mirror
formed on the second end surface, transmits output light
from the second light source through a wavelength filter
formed on the first end surface, causes the output light to
reflect on the reflecting mirror, and multiplexes the output
light; and a first monitor PD for monitoring optical power
with a part of the output light from the first light source.

3 Claims, 5 Drawing Sheets

(56)           References Cited

OTHER PUBLICATIONS

L.B. Aronson et al., *Transmitter Optical Subassembly for XFP Applications,* ECTC2005, DOI: 10.1109ECTC.2005.1441402, pp. 1058-1062.

\* cited by examiner

Fig. 4

OPTICAL TRANSMITTER

TECHNICAL FIELD

The present invention relates to an optical transmitter, and more particularly to a multi-wavelength channel optical transmitter using a wavelength multiplex optical transmission system.

BACKGROUND ART

Conventionally, with an increase in communication traffic, a wavelength multiplex optical transmission system has been used to increase the transmission capacity of an optical communication system. In order to perform wavelength multiplex optical transmission, a light source is prepared for each wavelength channel, and output light from a plurality of light sources is multiplexed by an optical multiplexer and output to an optical fiber. In the optical communication system, it is required to keep the optical intensity of an optical transmission signal constant, and in the wavelength multiplex optical transmission system, it is also necessary to keep the optical intensity of each wavelength channel constant. In view of this, a part of the optical transmission signal is branched to monitor the light intensity, and the light source is controlled so that the light intensity to be monitored becomes constant.

FIG. 1 shows an example of a conventional multi-wavelength channel optical transmitter that multiplexes four wavelengths. Output light from the light sources 10a to 10d for each wavelength channel is input to an optical multiplexer 20 through collimator lenses 31a to 31d and multiplexed. The output of the optical multiplexer 20 is multiplexed with all wavelength channels as wavelength multiplexed light through a condenser lens 32 and is coupled to an optical fiber 41.

An example of the light source is shown in FIG. 2. In the light source 10, a light source chip 11 including a modulation light source part 16 and an optical amplifier 15 is mounted on a subcarrier 12, and a monitor PD13 for monitoring a part of output light from the modulation light source part 16 is mounted on a rear end of the light source chip 11. The light output power of each wavelength channel is detected as a current value by the monitor PD13, and a control circuit 14 adjusts a current supply amount to the light source chip 11 so that the detected current value becomes constant. By such an optical output control circuit, it is possible to make the optical output power from each light source chip 11 constant at all times (for example, refer to NPL 2).

The optical multiplexer 20 includes a glass block 21, and an antireflection film 22 for transmitting output light from the first light source 10a is formed on an end surface on the light source side. A reflecting mirror 24 is formed on the end surface on the output side of the glass block 21, and the output light from the first light source 10a is reflected to the light source side. Wavelength filters 23b to 23d for transmitting output light from the second light sources 10b to 10d and reflecting light reflected by the reflecting mirror 24 is formed on the end surface on the light source side. The optical signal of each wavelength channel is reciprocated between the reflecting mirror 24 and the wavelength filters 23b to d, multiplexed in order, transmitted through an antireflection film 25 formed on the end surface on the output side, and output as wavelength multiplexed light.

Thus, the configuration in which the monitor PD13 is arranged at the rear end of the light source chip 11 can monitor the light output power proportional to the output light from the light source chip 11. However, it is impossible to accurately monitor the optical output power for each wavelength channel when the wavelength multiplexed light is output.

FIG. 3 shows another example of a conventional multi-wavelength channel optical transmitter. Output light from the light sources 50a to 50d for each wavelength channel is input to an optical multiplexer 20 through collimator lenses 31a to 31d and beam splitters 53a to 53d and multiplexed. The output of the optical multiplexer 20 is converted into a wavelength multiplexed light through a condenser lens 32, and all wavelength channels are multiplexed and coupled to the optical fiber 41 (for example, refer to NPL 1).

The output light from the light source chip 51 is partially branched by the beam splitters 53a to 53d and monitored by monitors PD54a to PD54d. The output of the monitors PD54a to d is input to the control circuit of the light source 50, and the amount of current supply to the light source chip 51 is adjusted so that the detected current value becomes constant.

Thus, the configuration in which the monitor PD54 is arranged on the output side of the light source chip 51 can accurately monitor the output from the optical amplifier of the light source 50, but the loss of light is generated by the passing loss of the beam splitter 53. There is also a problem that the output light from the first light source 50a has a large loss because the optical path length transmitted through the optical multiplexer 20 is longer than the optical path length of other wavelength channels.

Also, a method of monitoring the optical output power of each wavelength channel by applying a wavelength filter instead of a reflecting mirror as in the optical module described in PTL 1 has been known. However, providing individual wavelength filters for each wavelength channel has problems such as an increase in the number of components of the optical multiplexer and an increase in the number of manufacturing processes, resulting in cost increase.

CITATION LIST

Patent Literature

[PTL 1] Japanese Patent Application Laid-open No. 2017-98505

Non Patent Literature

[NPL 1] K. Tsuzuki et. al., "Full C-Band Tunable DFB Laser Array Copackaged With InP Mach-Zehnder Modulator for DWDM Optical Communication Systems," Journal of selected topics in quantum electronics, vol. 15, No. 3, pp. 521-527, 2009

[NPL 2] L. B. Aronson et. al., "Transmitter Optical Subassembly for XFP Applications," ECTC2005, DOI: 10.1109ECTC.2005.1441402

SUMMARY OF INVENTION

An embodiment of the present invention is an optical transmitter that multiplexes and outputs a plurality of wavelength channels, the optical transmitter including: a first light source; one or more second light sources having mutually different wavelengths and each having a wavelength different from that of the first light source; an optical multiplexer that transmits output light from the first light source from a first end surface to a second end surface facing the first end surface, causes the output light to reflect on a reflecting mirror formed on the second end surface, transmits output light from the second light source through a wavelength filter formed on the first end surface, causes the output light to reflect on the reflecting mirror, causes output light of each wavelength channel to reciprocate between the reflecting mirror and the wavelength filter, and sequentially multiplexes the output light; a first monitor PD for monitoring optical power with a part of the output light from the first light source as reflected light or transmitted light from the optical multiplexer; one or more second beam splitters inserted between each of the second light sources and the first end surface; and one or more second monitors PD for monitoring optical power branched from each of the second beam splitters.

According to this configuration, since the output light of the first light source having the longest optical path length transmitted through the optical multiplexer is monitored as reflected light or transmitted light from the optical multiplexer, optical loss can be suppressed.

BRIEF DESCRIPTION OF DRAWINGS

FIG. 4 is a diagram showing a multi-wavelength channel optical transmitter according to Example 1 of the present invention.

DESCRIPTION OF EMBODIMENTS

Figure 1:
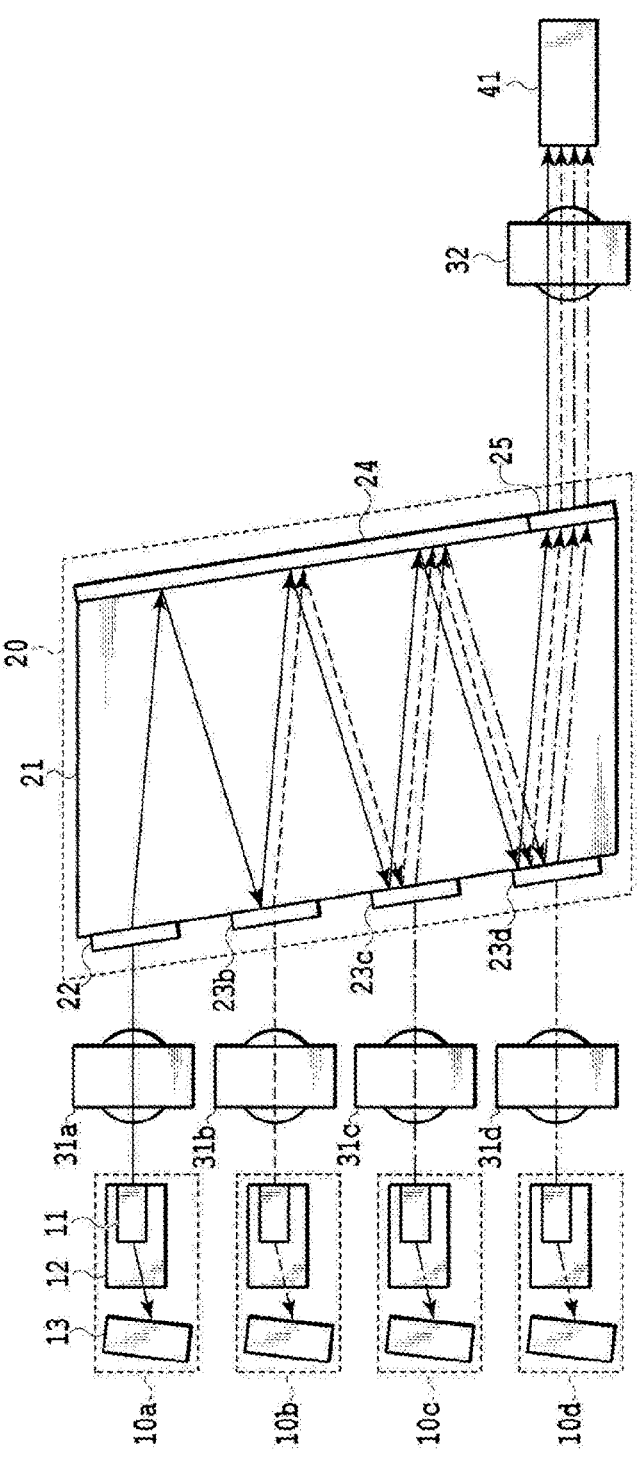
FIG. 1 is a diagram showing an example of a conventional multi-wavelength channel optical transmitter.

Embodiments of the present invention will be described in detail below with reference to the drawings.

Example 1

Figure 4:
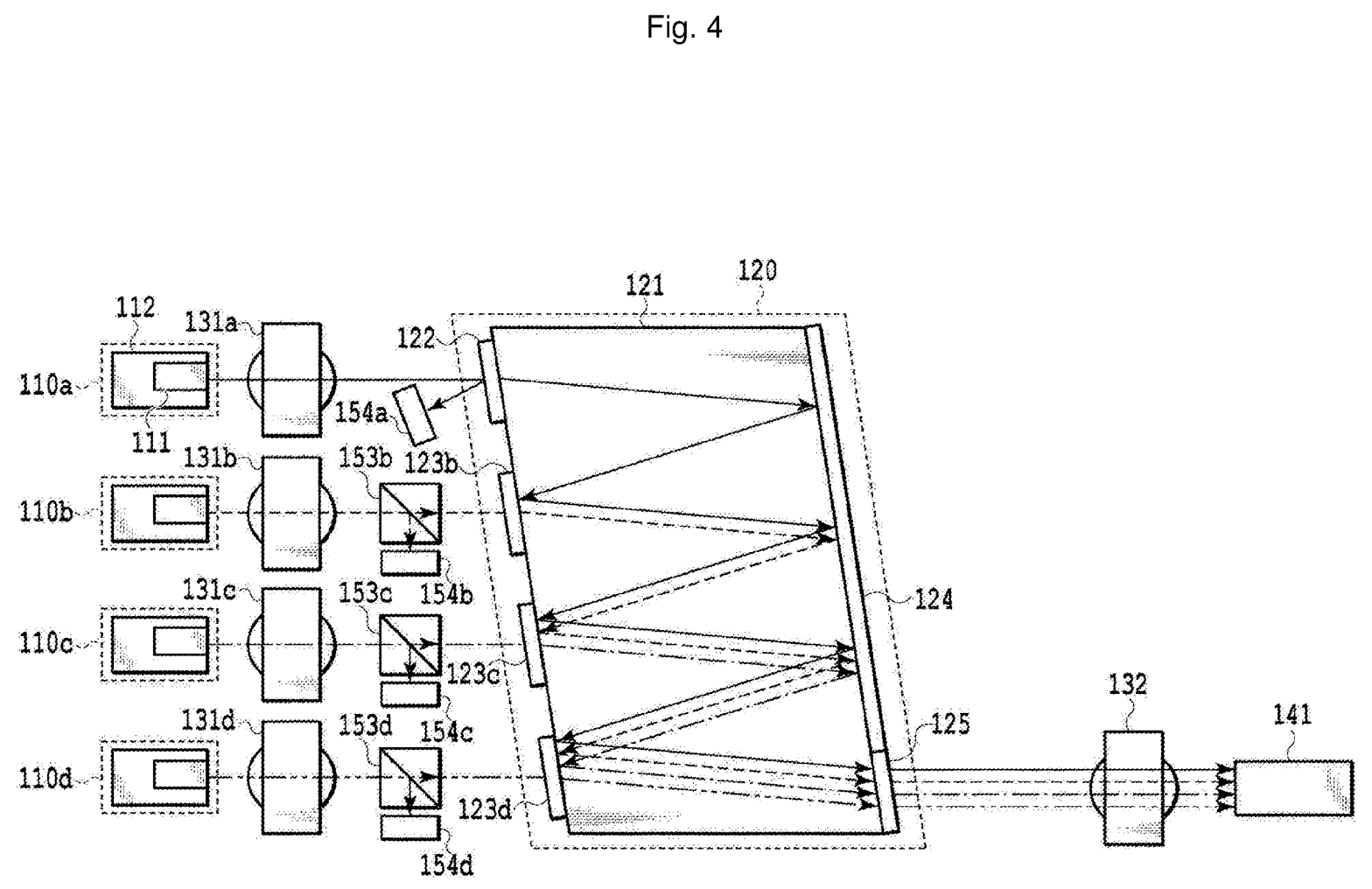

FIG. 4 shows an example of a multi-wavelength channel optical transmitter according to Example 1 of the present invention, which multiplexes four different wavelengths. Output light from light sources 110a to 110d for each wavelength channel is input to an optical multiplexer 120 through collimator lenses 131a to 131d and multiplexed. The output of the optical multiplexer 120 is multiplexed with all wavelength channels as wavelength multiplexed light through a condenser lens 132 and is coupled to an optical fiber 141.

The optical multiplexer 120 includes a glass block 121, and a beam splitter 122 which transmits output light from the first light source 110a and branches part of the output light to a monitor PD154a is formed on an end surface on the light source side. That is, part of the output light from the first light source 110a is input to the monitor PD154a as reflected light from the optical multiplexer 120, and the optical power of the output light from the first light source 110a is monitored. A reflecting mirror 124 is formed on an end surface on the output side of the glass block 121, and the output light from the first light source 110a is reflected to the light source side.

The output light from the second light sources 110b to 110d is partially branched by beam splitters 153b to 153d, and the optical power of each output light is monitored by monitors PD154b to 154d. Wavelength filters 123b to 123d for transmitting output light from the second light sources 110b to 110d and reflecting light reflected by the reflecting mirror 124 is formed on the end surface on the light source side. The optical signal of each wavelength channel is reciprocated between the reflecting mirror 124 and the wavelength filters 123b to 123d, multiplexed in order, transmitted through an antireflection film 125 formed on the end surface on the output side, and output as wavelength multiplexed light.

The output of the monitors Pd154a to 154d is input to the control circuit of the light source 110a, and the amount of current supply to the light source chip 111 is adjusted so that the detected current value becomes constant, that is, the optical power of each output light becomes constant.

Figure 3:
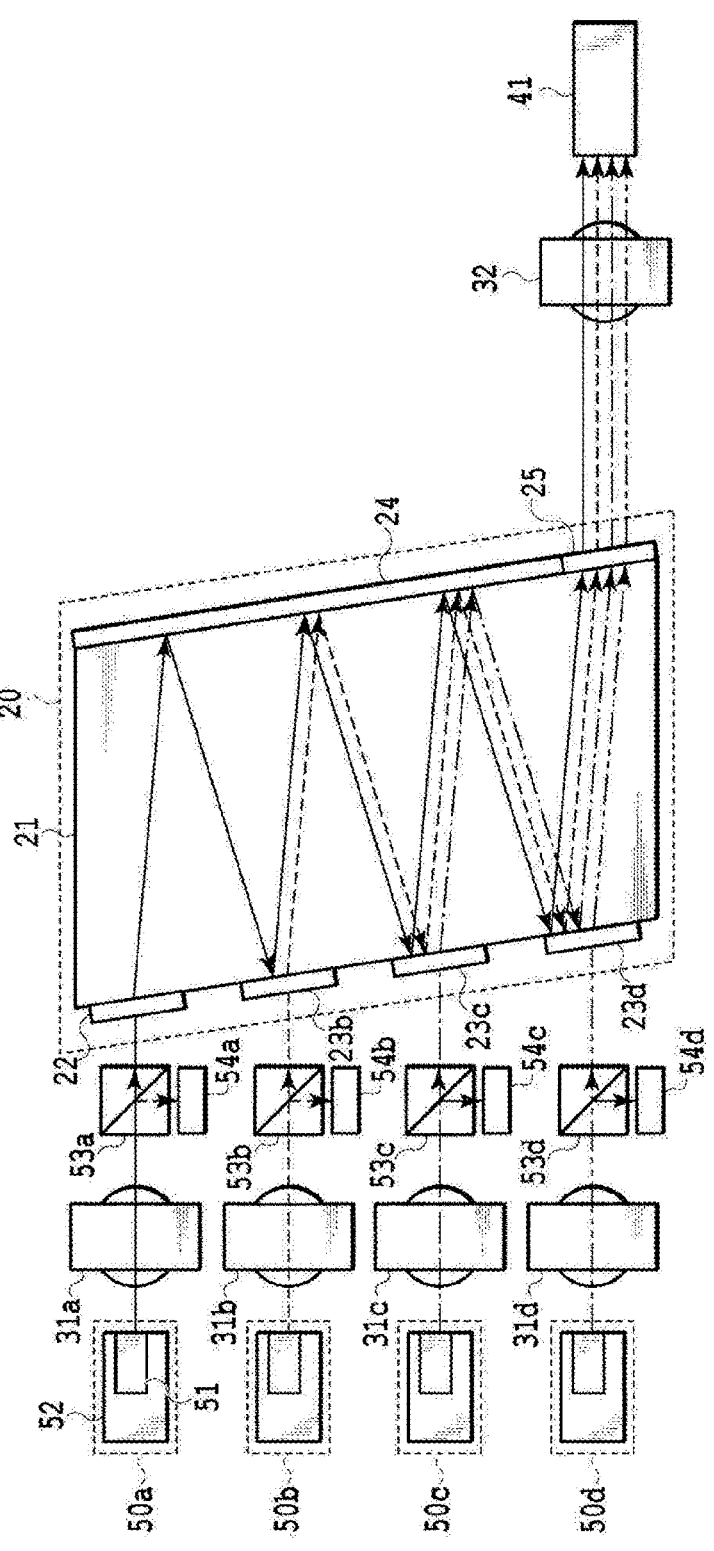
FIG. 3 is a diagram showing another example of the conventional multi-wavelength channel optical transmitter.

In the conventional optical transmitter shown in FIG. 3, the output light from the first light source is transmitted through the beam splitter 53a and the antireflection film 22 of the optical multiplexer 20 and propagated through the glass block 21. On the other hand, in the optical transmitter of Example 1, the output light is transmitted only through the beam splitter 122 of the optical multiplexer 120 and propagated through the glass block 121. The antireflection film is a unidirectional transmission film and can suppress reflection at the end surface of the glass block, but a component which reflects slightly is generated on the incident face of the antireflection film. Therefore, according to the optical transmitter of Example 1, the optical loss corresponding to the reflection component can be suppressed. The output light from the first light source 110a has a large loss because the optical path length transmitted through the optical multiplexer 120 is the longest as compared with the optical path length of other wavelength channels, but the optical loss corresponding to the reflection component can be suppressed.

The beam splitter 122 integrated in the optical multiplexer 120 has a reflectance of 4% and a transmittance of 96%. Also, the beam splitters 153b to 153d arranged on optical paths from the second light sources 110b to 110d have a reflectance of 4% and a transmittance of 96%. The transmittance of the antireflection film 22 of the conventional optical transmitter shown in FIG. 3 is 99%. The glass block 121 has an optical loss of 1% in propagation among the beam splitter 122, the wavelength filters 123b to d and the reflecting mirror 124. The lens coupling efficiency from the output of the optical multiplexer 120 to the optical fiber 141 is 63%.

After the optical transmitter was assembled as a multi-wavelength channel optical transmitter, the output of the light source chip 111 of each wavelength channel was set to be +4 dBm, and the optical output coupled to the optical fiber 141 was measured. In Example 1, the optical outputs from the wavelength channels 1 to 4 of the light sources 110a to 110d were +1.12, +1.25, +1.47, and +1.69 dBm, respectively. As compared with the conventional optical transmitter shown in FIG. 3, the optical outputs from the respective wavelength channels 1 to 4 of the light sources 10a to 10d were +1.07, +1.25, +1.47, and +1.69 dBm. According to Example 1, the optical output of the light source 110a in the wavelength channel 1 can be improved to 0.05 dB.

Example 2

Figure 5:
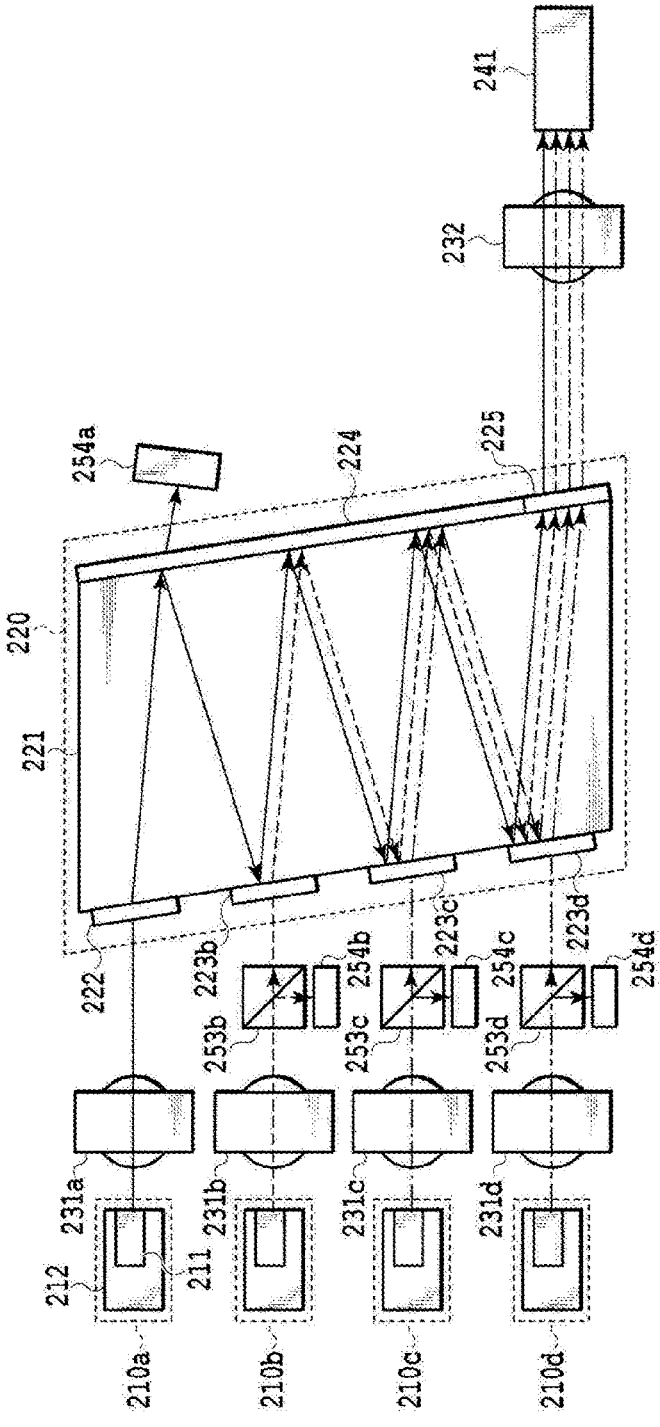
FIG. 5 is a diagram showing a multi-wavelength channel optical transmitter according to Example 2 of the present invention.

FIG. 5 shows an example of a multi-wavelength channel optical transmitter according to Example 2 of the present invention, which multiplexes four different wavelengths. Output light from light sources 210a to 210d for respective wavelength channels is input to an optical multiplexer 220 through collimator lenses 231a to 231d and multiplexed. The output of the optical multiplexer 220 is multiplexed with all wavelength channels as wavelength multiplexed light through a condenser lens 232 and is coupled to an optical fiber 241.

The optical multiplexer 220 includes a glass block 221, and an antireflection film 222 for transmitting output light from the first light source 210a is formed on an end surface on the light source side. A reflecting mirror 224 is formed on an end surface on the output side of the glass block 221, and the output light from the first light source 210a is reflected to the light source side. The reflecting mirror 224 is a total reflecting film, and a component transmitting slight light is generated. That is, part of the output light from the first light source 210a is input to a monitor PD254a as the transmitted light from the optical multiplexer 220, and the optical power of the output light from the first light source 210a is monitored.

The output light from the second light sources 210b to 210d is partially branched by beam splitters 253b to 253d and monitored by the monitors PD254b to 254d. Wavelength filters 223b to 223d for transmitting output light from the second light sources 210b to 210d and reflecting light reflected by the reflecting mirror 224 are formed on the end surface on the light source side. The optical signal of each wavelength channel is reciprocated between the reflecting mirror 224 and the wavelength filters 223b to 223d, multiplexed in order, transmitted through an antireflection film 225 formed on the end surface on the output side, and output as wavelength multiplexed light.

The output of the monitor PD254a to 254d is input to the control circuit of the light source 210a, and the amount of current supply to the light source chip 211 is adjusted so that the detected current value becomes constant, that is, the optical power of each output light becomes constant.

In the optical transmitter of Example 2, the output light is transmitted only through the antireflection film 222 of the optical multiplexer 220 and propagated through the glass block 221. Therefore, as compared with the conventional optical transmitter shown in FIG. 3, the optical loss can be suppressed by the passing loss of the beam splitter.

The antireflection film 222 integrated in the optical multiplexer 220 has a transmittance of 99%. The beam splitters 253b to 253d arranged optical paths from the second light sources 210b to 210d have a reflectance of 2% and a transmittance of 98%. The beam splitter 53a of the conventional optical transmitter shown in FIG. 3 also has a reflectance of 2% and a transmittance of 98%. The glass block 221 has an optical loss of 1% in propagation between the antireflection film 222, the wavelength filters 223b to 223d, and the reflecting mirror 224. The lens coupling efficiency from the output of the optical multiplexer 220 to the optical fiber 241 is 63%.

Figure 2:
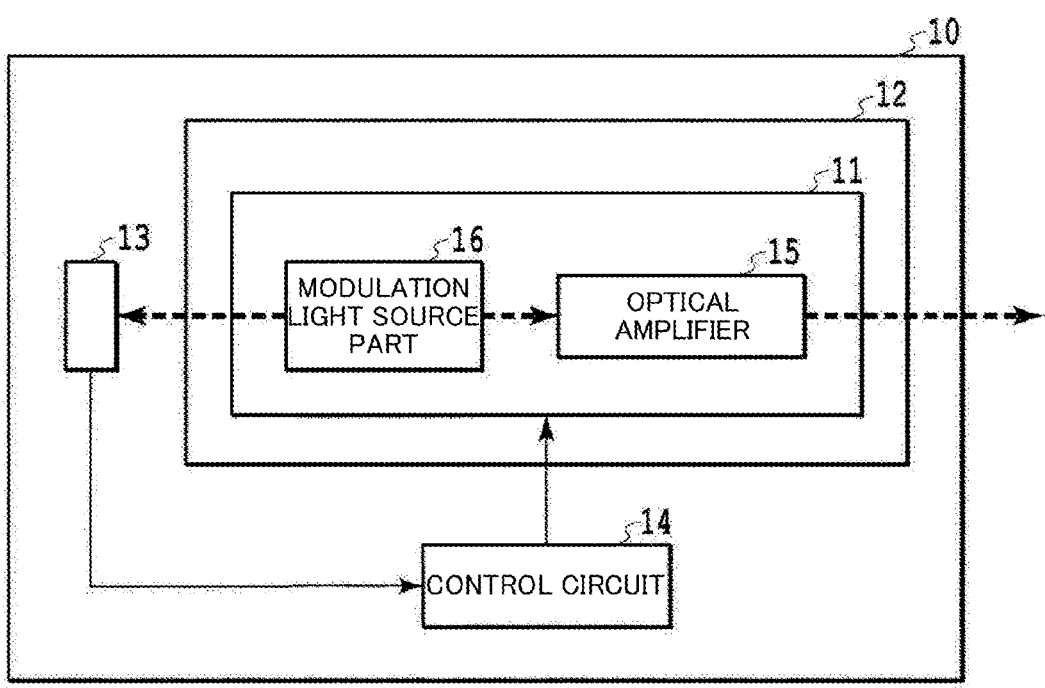
FIG. 2 is a diagram showing an example of a light source of the conventional multi-wavelength channel optical transmitter.

After the optical transmitter was assembled as a multi-wavelength channel optical transmitter, the output of the light source chip 211 of each wavelength channel was set to +5 dBm, and the optical output coupled to the optical fiber 241 was measured. In Example 2, the optical outputs of the respective wavelength channels 1 to 4 of the light sources 210a to 210d were +2.12, +2.26, +2.52, and +2.78 dBm respectively. As compared with the conventional optical transmitter shown in FIG. 2, the optical outputs from the respective wavelength channels 1 to 4 of the light sources 10a to d were +2.04, +2.26, +2.52, and +2.78 dBm, respectively. According to Example 2, the optical output of the light source 210a in the wavelength channel 1 can be improved to 0.08 dB.

The present embodiment relates to a multi-wavelength channel optical transmitter for multiplexing four wavelengths and has explained, as examples, the first light source of the wavelength channel having the longest optical path length transmitting through the optical multiplexer and the three second light sources of the other wavelength channels are explained as examples. The present embodiment can be applied as long as the number of the second light sources is one or more.

The invention claimed is:

1. An optical transmitter that multiplexes and outputs a plurality of wavelength channels, the optical transmitter comprising:

a first light source;

one or more second light sources having mutually different wavelengths and each having a wavelength different from that of the first light source;

an optical multiplexer that transmits output light from the first light source from a first end surface to a second end surface facing the first end surface, causes the output light to reflect on a reflecting mirror formed on the second end surface, transmits output light from the second light source through a wavelength filter formed on the first end surface, causes the output light to reflect on the reflecting mirror, causes output light of each wavelength channel to reciprocate between the reflecting mirror and the wavelength filter, and sequentially multiplexes the output light;

a first monitor PD for monitoring optical power with a part of the output light from the first light source as reflected light or transmitted light from the optical multiplexer;

one or more second beam splitters inserted between each of the second light sources and the first end surface; and one or more second monitors PD for monitoring optical power branched from each of the second beam splitters, wherein an optical path length when the output light from the first light source passes through the optical multiplexer is longer than an optical path length when the output light from the second light source passes through the optical multiplexer.

2. The optical transmitter according to claim 1, further comprising: a first beam splitter formed on the first end surface and configured to branch part of the output light from the first light source to the first monitor PD.

3. The optical transmitter according to claim 1, wherein the output light from the first light source reaches the second end surface, and part of the output light transmitted through the reflecting mirror is input to the first monitor PD.

* * * * *